United States Patent
Tai

Patent Number: 5,526,418
Date of Patent: Jun. 11, 1996

[54] RINGER CIRCUIT

[75] Inventor: Weng C. Tai, Taoyuan, Taiwan

[73] Assignee: Acer Peripherals, Kweishan, Taiwan

[21] Appl. No.: 328,449

[22] Filed: Oct. 24, 1994

[51] Int. Cl.⁶ ................................................ H04M 1/00
[52] U.S. Cl. .................... 379/373; 379/375; 379/377; 379/418
[58] Field of Search .................. 379/373, 375, 379/387, 418, 377

[56] References Cited

U.S. PATENT DOCUMENTS

| | | | |
|---|---|---|---|
| 4,309,574 | 2/1982 | Sublette et al. | 379/375 |
| 4,658,419 | 4/1987 | Denen | 379/375 |

*Primary Examiner*—Jeffery Hofsass
*Assistant Examiner*—Jacques M. Saint-Surin
*Attorney, Agent, or Firm*—Fish & Richardson

[57] ABSTRACT

A ringer circuit comprising a rectifier circuit, a voltage regulator and a ringer generation circuit is provided. The rectifier circuit generates a DC voltage signal at an output terminal and has an input terminal adapted to receive a ring input signal and a ground terminal. The voltage regulator generates a voltage signal, responsive to the DC voltage signal. The ringer generation circuit outputs a ring audio, responsive to the voltage signal. As a voltage level of the ring input signal exceeds a predetermined value, the voltage signal substantially equals to a fixed value, and as the voltage level of the ring input signal does not exceed the predetermined value, the voltage signal substantially equals to the DC voltage signal.

4 Claims, 1 Drawing Sheet

5,526,418

RINGER CIRCUIT

TECHNICAL FIELD OF THE INVENTION

The invention relates generally to a ringer circuit and in particular, to a ringer circuit which increases the maximum number of ringer equipments allowed to be connected onto a telecommunication network.

BACKGROUND OF THE INVENTION

Typically, a ringer circuit is provided in the telecommunication terminal equipments, e.g. telephone, facsimile machine, of the telecommunication network. When the telecommunication ring signal comes in, the terminal equipment generates a ringer audio signal in response informing the user to receive the message coming in.

The Federal Communication Committee (FCC) sets up a plurality of standards on the telecommunication equipments having a ringer circuit, which are to be followed by the industry. Among them is the Ring Equipment Number (REN) value of a telecommunication ring equipment, which is a measure of the impedance of the ring equipment. The detailed guideline and method of calculating REN of a ringer generation equipment may be found in 47 CFR Chapter 1, Section 68.312 and therefore will not be reiterated herein. However, generally speaking, as REN calculated is larger, it implies that the impedance of the ringer generation equipment is smaller and vice versa. The higher REN value an individual ringer generation equipment has, the smaller the number of ringer generation equipments allowed to be connected onto the telecommunication network is. FCC also regulates that the REN of a single telecommunication ringer generation equipment has to be smaller than 5. The prior art ringer circuit, as shown in FIG. 1, mainly includes a rectifier 11, a Zener diode 12, a capacitor 13 of a filter function and a ringer generation circuit 14. Furthermore, the capacitor c1 is provided to filter the direct current (DC) signal and to allow the passage of the alternating current (AC) signal. The resistor R1 is a current limiting resistor.

When AC ringer input signal V comes in via input terminals a, b, a DC voltage is generated at the output terminal H of the capacitor 13 to drive the ringer generation circuit 14. Since the ringer generation circuit 14 is easily damaged by a higher voltage, a Zener diode 12 is usually supplied to protect it. The ringer generation circuit 14 may be designed in a well known manner.

However, during the testing of the ringer circuit shown in FIG.1 under a high voltage ring input signal, e.g. 150 V/68 Hz, the Zener diode 12 is conducting and accordingly presents a lower impedance value. As a result, the REN obtained will be larger. Telecommunication equipment labelled with a larger REN value would have, in general, a negative influence on the sales of this equipment.

Under the aforesaid testing environment, a current limiting resistor R1 with larger resistive value has to be used in order to lower the obtained REN value. But, as this measure is taken and under a normal operation condition, e.g. an input ring signal with voltage between 40 V through 150 V, the DC voltage at H terminal will decrease. As a result, the ringer audio signal generated from the ringer generation circuit 14 and heard by the end user will be too small. In other words, if we adopt the circuit such as that in FIG. 1, requirement of lower REN value while generating a larger ringer audio signal heard by the end user can not be met at the same time.

SUMMARY OF THE INVENTION

To the shortcomings of aforesaid conventional art, the invention, in one aspect, provides a ringer circuit which increases the number of ringer generation equipments allowed to be connected onto a telecommunication network.

Another aspect of the invention is to provide a ringer circuit with which a lower REN value is obtained during the high voltage testing period and the volume of audio signal generated is not decreased during a daily operation of the ringer generation equipment.

The provided ringer circuit includes a rectifier circuit, a voltage regulator and a ringer generation circuit. The rectifier circuit generates a DC voltage signal at an output terminal and has an input terminal adapted to receive a ring input signal and a ground terminal. The voltage regulator generates a voltage signal, responsive to the DC voltage signal. The ringer generation circuit outputs a ring audio, responsive to the voltage signal. As a voltage level of the ring input signal exceeds a predetermined value, the voltage signal substantially equals to a fixed value, and as the voltage level of the ring input signal does not exceed the predetermined value, the voltage signal substantially equals to the DC voltage signal.

The spirit and further details of the invention will be further understood by the following detailed description of the invention along with the accompanied drawings.

DETAILED DESCRIPTION OF A PREFERRED EMBODIMENT

Figure 1:
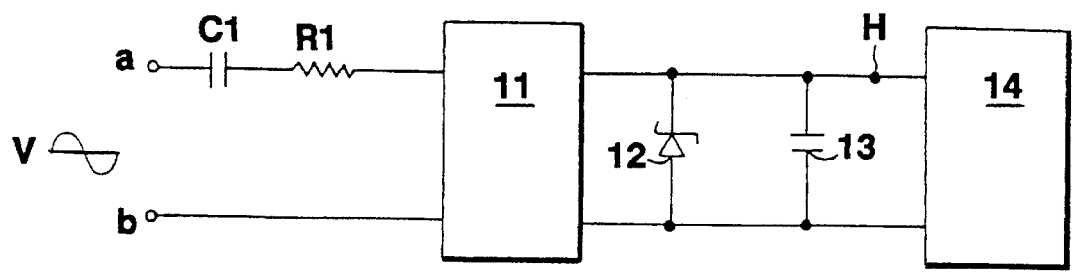
FIG. 1 discloses a ringer circuit in accordance with the prior art.
Figure 2:
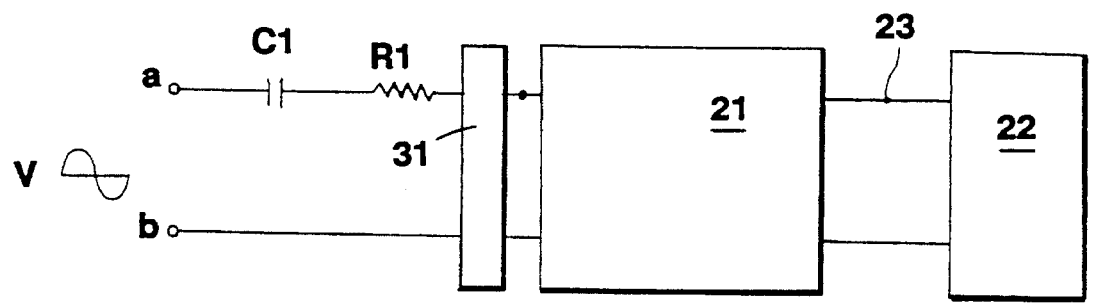
FIG. 2 shows a functional blocks of the invention.

As shown in FIG. 2, the invention includes a rectifier circuit 31, a voltage regulator 21 and a ringer generation circuit 22. When a voltage level of the ring input signal V exceeds a predetermined value, the voltage value of the voltage signal 23 substantially equals to a fixed value, and as the voltage level of the ring input signal V does not exceed the predetermined value, the voltage value of the voltage signal 23 substantially equals to a DC voltage signal output from the output terminal of a rectifier circuit 31 which will be clear hereinafter. The predetermined value is determined by the components used in the shown circuit.

Figure 3:
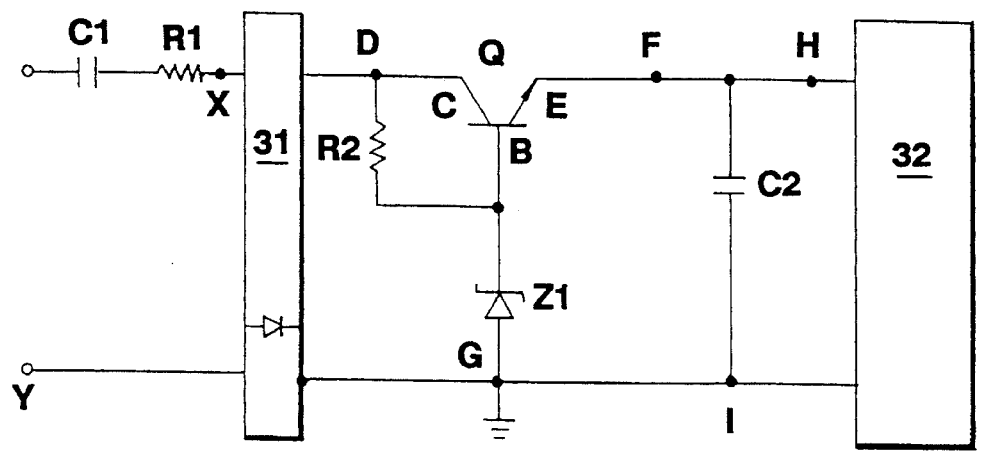
FIG. 3 shows the detailed circuit arrangement of a preferred embodiment of the invention.

As shown in FIG. 3, the rectifier circuit 31 has an input terminal X which receives the ring input signal V via capacitor c1 and resistor R1, a ground terminal G and an output terminal D which generates a DC voltage signal. The ring input signal V is first processed by the capacitor C1 and resistor R1 before receipt by the rectifier circuit 31. A preferred embodiment of the rectifier circuit 31 is a bridge rectifier.

The voltage regulator 21, responsive to the DC voltage signal at the terminal D, generates a voltage signal 23 of a voltage value. The ringer generation circuit 22, responsive to the voltage signal 23, outputs a ring audio signal to be heard by the end user.

The preferred embodiment of the voltage regulator 21, as shown in FIG. 3, includes a transistor Q, a zener diode Z1 and a resistor R2.

The transistor Q has a collector terminal C coupled to the output terminal D, a base terminal B and an emitter terminal E which generates a first voltage signal. The Zener diode Z1 has a cathode and an anode. The cathode is coupled to the base terminal B and the anode is coupled to the ground terminal G. The resistor R2 has a first terminal coupled to the collector terminal C and a second terminal coupled to the base terminal B. One preferred embodiment of the resistor R2 has value as high as 15K.

The voltage regulator 21 further includes a filter circuit which consists of a capacitor c2 for filtering the first voltage signal and generating the voltage signal which operates the ringer generation circuit 32. The capacitor C2 has a second terminal I coupled to the anode of the Zener diode Z1 and a first terminal F inputing the first voltage signal. The output voltage signal is taken at the terminal H.

As a testing ring input signal with high voltage value comes in via terminal X, Y, during which the Zener diode Z1 is conducting, voltage value of ring input signal minusing the Zener voltage of the Zener diode Z1 is substantially applied on the resistor R2. Looking into the circuit at the terminals X and Y, the effective impedance equals to R2. When a large value resistor R2 is employed, the calculated REN value will decrease as intended.

Moreover, since the existence of Zener diode Z1 along with the fact of the voltage drop of 0.6 volts between the base B and emitter E terminals of the transistor Q, the output voltage across the capacitor c2 will always be less than Zener voltage of the Zener diode Z1 by 0.6 volts as long as the voltage value of the input ring signal V exceeds the predetermined value. This arrangement may protect the ringer generation circuit 32.

During the non-testing operation of the circuit, the Zener diode Z1 is not conducting as the ring input signal with lower voltage value comes in via terminals X, Y. In other words, one portion Ic of the current from the output terminal D enters the collector terminal C and another portion Ib enters the base terminal B via resistor R2. However, due to the characteristics $Ic=\beta\ Ib$ of the transistor Q and, during this period, the fact of Z1 being off, the current Ib flowing through resistor R2 is very small which results in a very small voltage drop. In other words, the voltage value of Base terminal B at this time is substantially equals to that of D terminal. And since the voltage drop between the base terminal B and emitter terminal E is substantially equal to 0.6 volts only, accordingly, the voltage of F terminal is substantially equal to that of the terminal D. All energy of the signal at terminal D is almost fully applied on the terminal H to operate the ringer generation circuit 32. Due to non-existence of substantial energy loss, the volume of ring audio heard by the end user will be not decreased significantly. In other words, as the voltage level of the ring input signal V does not exceed the predetermined value, the voltage value of the signal at terminal D appears almost fully on the terminal F without any substantial energy loss. This is the main function of the voltage regulator circuit 21. Moreover, the voltage regulator circuit 21 has a high impedance value causing a smaller REN value.

What is claimed is:

1. A ringer circuit having an input impedance, said ringer circuit comprising:

a rectifier circuit having an input terminal adapted to receive a ring input signal and a ground terminal, said rectifier circuit generating a DC voltage signal at an output terminal;

a voltage regulator, in response to the DC voltage signal, for generating an output voltage signal, said voltage regulator including:

a transistor having a base terminal and an emitter terminal and having a collector terminal coupled to said output terminal, said transistor configured to generate the output voltage signal at said emitter terminal, a Zener diode having a cathode and an anode, said cathode being coupled to said base terminal and said anode being coupled to said ground terminal; and a resistor coupled between said collector terminal and said base terminal, said ringer circuit further comprising:

a ringer generation circuit, which in response to said output voltage signal, outputs an audio ring signal;

wherein, as a voltage level of said ring input signal exceeds a predetermined value, said output voltage signal substantially equals a fixed value and the input impedance of the ringer circuit is at least as large as the value of said resistor, and as the voltage level of said ring input signal does not exceed the predetermined value, said output voltage signal substantially equals said DC voltage signal.

2. The ringer circuit according to claim 1, wherein the voltage regulator further comprises:

a filter circuit for filtering said output voltage signal.

3. The ringer circuit according to claim 1, wherein said rectifier circuit is a bridge rectifier.

4. The ringer circuit according to claim 2, wherein the filter circuit comprises a capacitor, said capacitor having a first terminal coupled to said anode and a second terminal inputting said output voltage signal.

* * * * *